United States Patent [19]
Descot et al.

[11] Patent Number: 5,852,642
[45] Date of Patent: Dec. 22, 1998

[54] METHOD AND APPARATUS FOR INSPECTING THE GEOMETRY OF A GUIDE TUBE

[75] Inventors: Pascal Descot, Saint-Chamond; Bruno Fichet, Saint-Loup-de-Varennes, both of France

[73] Assignees: Framatome, Courbevoie; Compagnie Generale Des Matières Nucleaires, Velizy-Villacoublay, both of France

[21] Appl. No.: 882,729

[22] Filed: Jun. 26, 1997

[30] Foreign Application Priority Data

Jun. 26, 1996 [FR] France ................................... 96 07927

[51] Int. Cl.$^6$ ..................................................... G21C 17/00
[52] U.S. Cl. ............................ 376/245; 376/258; 33/502; 33/533
[58] Field of Search ..................................... 376/245, 249, 376/258; 33/502, 533

[56] References Cited

U.S. PATENT DOCUMENTS

| | | | |
|---|---|---|---|
| 4,318,776 | 3/1982 | Pröll et al. ............................... | 376/254 |
| 4,655,990 | 4/1987 | Leclercq .................................. | 376/225 |
| 4,696,190 | 9/1987 | Bucher et al. ............................ | 33/533 |
| 4,728,483 | 3/1988 | Ahmed et al. .......................... | 376/258 |
| 5,268,940 | 12/1993 | Roseveare ............................... | 376/249 |
| 5,404,381 | 4/1995 | Cartry ..................................... | 376/249 |

FOREIGN PATENT DOCUMENTS 0059301  1/1982  European Pat. Off. .

*Primary Examiner*—Daniel D. Wasil
*Attorney, Agent, or Firm*—Law Offices Pollock, Vande Sande & Amernick

[57] ABSTRACT

The apparatus is for internal inspection of a guide tube of a nuclear fuel assembly and measurement of deformations of a zone of smaller diameter in a terminal portion of the tube. The apparatus has a stick whose distal portion presents, in succession, starting from a distal end of the stick-shaped means, a guiding swelling having an easy fit in the zone of smaller diameter and two projections. The first projection carries two sets of diametrically opposite strain sensors provided with conductors linking them to a proximal end of the stick. A sleeve slides in a running portion of the guide tube above the zone of smaller diameter and slides over the stick. The sleeve and said stick-shaped means have mutually cooperating abutments for limiting displacement of the sleeve towards the distal portion to a position where the sleeve surrounds the stick.

9 Claims, 2 Drawing Sheets

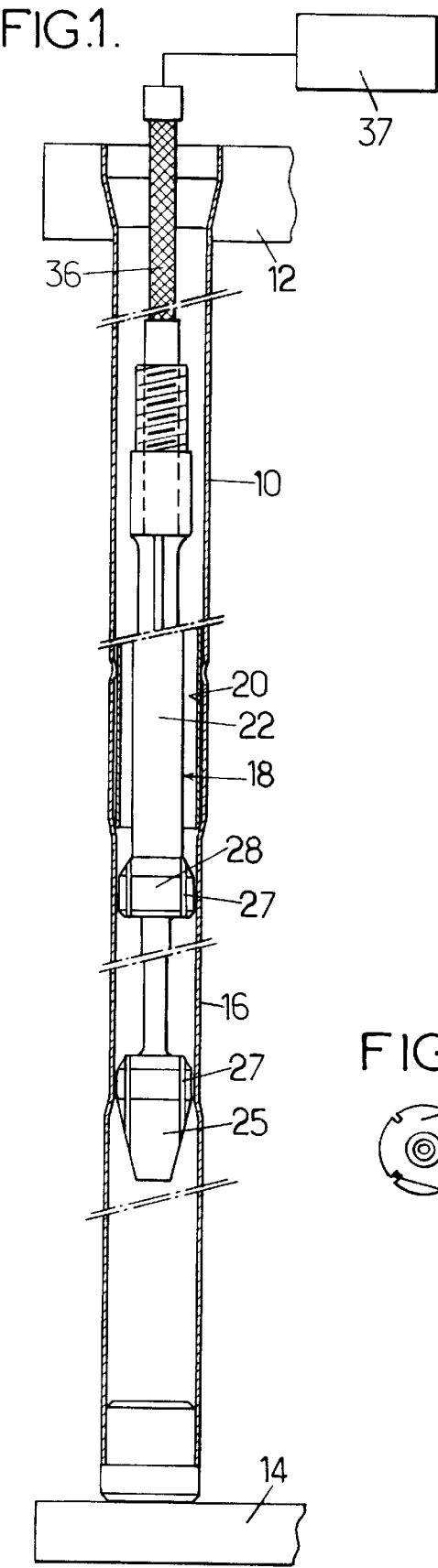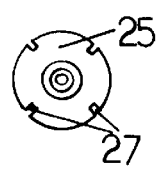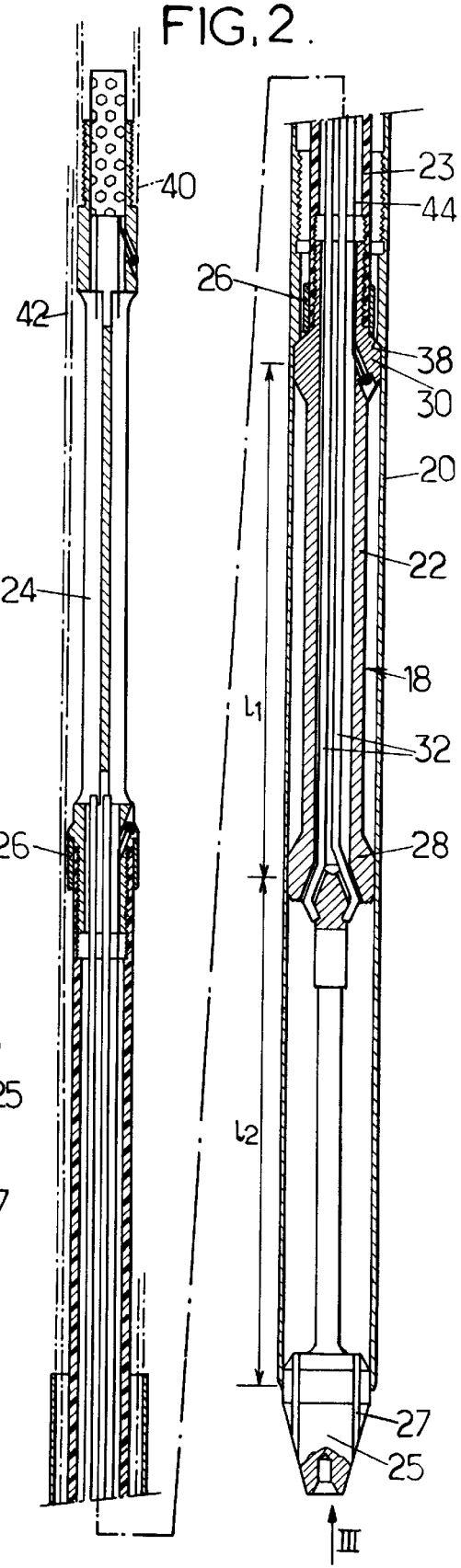

METHOD AND APPARATUS FOR INSPECTING THE GEOMETRY OF A GUIDE TUBE

BACKGROUND OF THE INVENTION

The present invention relates to inspecting the straightness of a guide tube of a nuclear fuel assembly, the guide tube including a zone of smaller diameter in its terminal portion.

A guide tube for a fuel assembly often has a zone of smaller diameter in its bottom portion. The smaller diameter is very slightly greater than the diameter of a control cluster rod liable to move down the tube. The purpose of the zone of smaller diameter is to brake the fall of the control cluster by hydraulic throttling of the coolant contained in the tube.

After a work cycle in a reactor, a fuel assembly can present deformations causing the guide tube to have a shape that is not rectilinear. It is important to detect the existence and the magnitude of such deformations before reloading into the reactor, in order to guarantee that the rods of a control cluster can pass freely along the guide tubes.

SUMMARY OF THE INVENTION

An object of the invention is to provide apparatus and a method for obtaining a profile of inner deformations of a guide tube, that can be used while the assembly is being kept under water, and preferably to cause the required relative displacements to be performed by making use of the means which are required for handling the fuel assembly.

To this end, the invention provides apparatus comprising stick-shaped means having a distal portion which presents in succession, starting from the end of the stick, a guide swelling having a diameter enabling it to have a sliding fit in the zone of smaller diameter, and two projections, with at least the projection closer to the swelling carrying at least two sets of diametrically opposite strain sensors provided with conductors linking them to the proximal end of the stick, the apparatus further comprising a sleeve capable of sliding in a running portion of the guide tube and over the stick, and of coming into abutment against the narrow zone, displacement of the sleeve towards the distal portion being limited by abutment against the stick in a determined position where the sleeve surrounds the stick.

The strain sensors may be constituted by resistive strain gauges fixed to the stick and each providing an output signal which is an increasing function of the strains and deformations to which the stick is subjected. To facilitate manufacture, the stick may be made up of two portions, one of which carries the sensors.

The assembly constituted by the stick with its sensors and the sleeve constitutes a unit which, while the apparatus is in use, is connected to a measurement unit via conductors. The apparatus generally also includes means for determining the relative orientation of the stick and of the guide tube.

Thus, on the basis of deformations measured in two mutually orthogonal directions extending transversely to the axis of the tube under investigation, the apparatus can provide a profile of the amplitude and of the orientation of deformation at all levels within the zone of smaller diameter.

The apparatus can also be used to measure any deformation that may exist in the tube away from its zone of smaller diameter; for this purpose, the projections may be fitted with rings of outside diameter enabling them to slide in the running portion of the guide tube.

The invention also provides a method implementing an assembly of the above-defined kind, comprising: inserting said assembly into the guide tube by relative displacement between the guide tube and the assembly until the sleeve comes into abutment against the narrow zone, moving the guide tube relative to the stick so as to make the projections scan the entire zone of smaller diameter, and deriving the amplitude and the orientation of deformations from the signals provided by the sensors and from a measurement of the displacement of the stick along the axis of the guide tube.

The above features and others advantageously usable in connection with the above but capable of being used independently appear on reading the following description of a particular embodiment, given by way of non-limiting example.

BRIEF DESCRIPTION OF THE DRAWINGS

FIG. 1 is a diagram for showing the measurement assembly of apparatus of the invention, in place in a guide tube;

FIG. 2 is an overall view in longitudinal section;

FIG. 3 is an overall view from beneath; and

DETAILED DESCRIPTION

Figure 4:
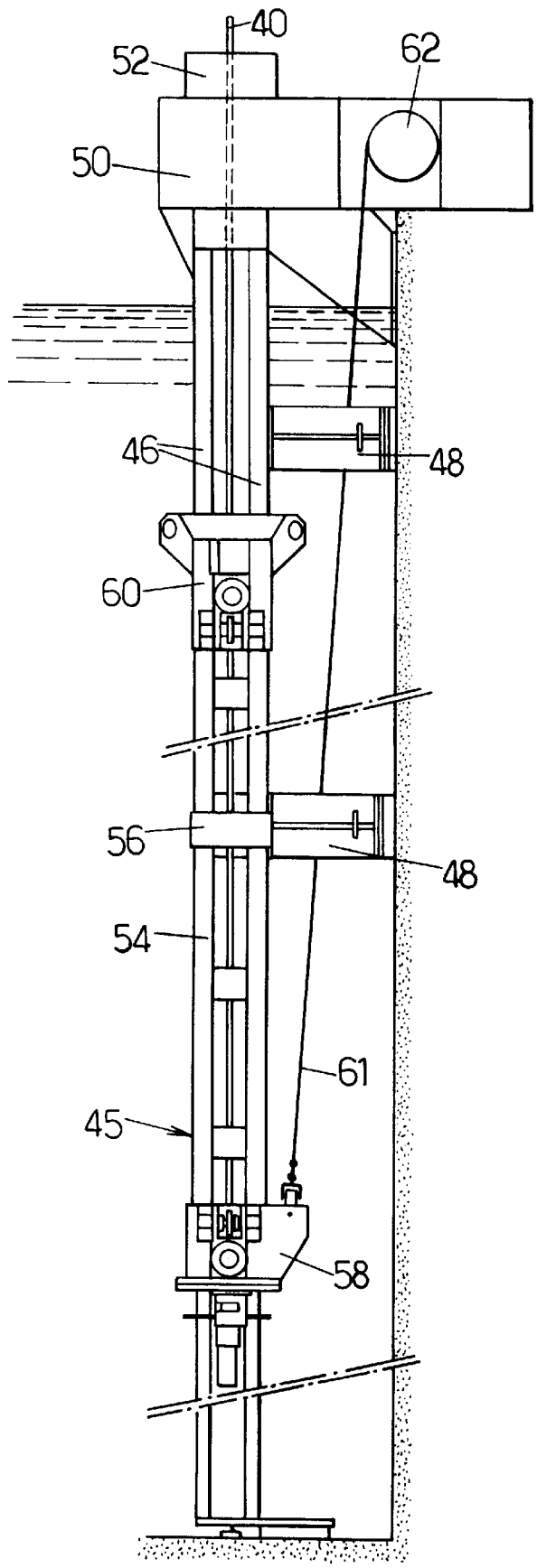
FIG. 4 is a diagram showing the lift or hoist of a handling installation in a pool enabling the method to be implemented.

The apparatus whose essential elements are shown in FIG. 1 is designed to measure the deformation of a guide tube 10 connecting the top nozzle 12 to the bottom nozzle 14 of a nuclear fuel assembly. In the vicinity of its bottom end, and in some cases all the way to said bottom end, the guide tube presents a zone 16 of smaller diameter in which possible deformation can have severe consequences; in particular a control cluster rod can be jammed. As shown, the apparatus serves to measure guide tube deformation at this level, and thus, for example, to provide a profile of the axis of the guide tube in the zone of smaller diameter.

The apparatus can be considered as comprising a measuring stick 18 (such word being used to designate any stick-like means) and a sleeve 20 that are movable relative to each other in an axial direction (i.e. vertically when the assembly is in its usual orientation). The stick 18 is itself made up of a plurality of mutually connected parts, so as to make it easier to manufacture and so as to adapt its flexibility at each level. As shown in FIG. 2, it comprises a tubular probe body 22, a flexible or hinged sheath 23 and a cable box 24. The top end of the tubular probe body is internally threaded and screwed onto the threaded end portion of the flexible sheath. The sheath is itself secured to the cable box, and a ring 26 may be provided around the connection to prevent bursting.

The body 22 is in the form of a shaft between a terminal guide swelling 25 of a diameter providing a sliding fit in the zone of smaller diameter, and a first projection 28 also having a sliding fit, with reduced friction through said zone. Slots 27 in the terminal guide swelling enable coolant to pass along the tube while measurements are performed in a fuel storage pool.

Between the first projection 28 and a second projection 30 having the same diameter as the first projection 28 and as the swelling 25, the body of the probe is hollow to provide a central duct for passing sheaths 32, four in number for example, containing conductors for connecting measurement sensors with the outside. Fluting formed in the projections, similar to the slots 27, allow the coolant to pass.

The distances $l_1$ and $l_2$ between the terminal guide swelling 25, the first projection 28, and the second projection 30 are much shorter than the axial length of the smaller diameter zone, to enable deformation of the smaller diameter zone to be measured therealong. By way of example, it is possible to use $l_1=l_2=60$ mm for a zone having a total length of about 500 mm.

The probe body 22 is sufficiently flexible to be capable of bending to adapt to deformations in the narrow zone which give rise to strains measured by the sensors. A set of sensors is placed close to the first projection. It includes at least four sensors uniformly distributed around the axis, so that their output signals enable the amount and the direction of any deformations to be calculated. The sensors associated with the first projection 28 may be fixed to the shaft immediately beneath said projection and connected to the conductors via sloping holes formed in the first projection. Other sensors may be associated with the second projection for similarly performing measurement. However, the second projection will generally serve solely to guide the probe body.

The box 24 may be formed by a shaft, e.g. a cruciform shaft defining passages for the sheaths 32. The swollen top end of the box receives the end of an electric cable 36 linked to a measurement device 37 located at a distance. The likewise swollen bottom end of the box 24 is fixed to the sheath 23. To give it the required flexibility, the sheath may be made of synthetic material, for example, while the other portions of the measurement stick are made of metal, e.g. of stainless steel.

The sleeve 20 is slightly longer than $l_1+l_2$. Its outside diameter is constant and enables it to slide as an easy fit in the running portion of the guide tube. Nevertheless, this outside diameter is large enough to ensure that the sleeve comes into abutment against the beginning of the smaller diameter zone of the guide tube, when the unit constituted by the stick and the sleeve moves down inside the guide tube.

The inside diameter of the sleeve 20 is such as to enable it to slide over the terminal swelling and the projections, except at its top end which has a shoulder 38 for bearing against the projection 30. This inside diameter also provides continuity with the zone of smaller diameter.

The measurement stick 18 and the sleeve 20 are designed to be connectable to respective drive tubes 40 and 42, a fraction of which is shown in chain-dotted lines in FIG. 2. These tubes are connected to drive mechanisms enabling them to be raised and lowered.

Finally, to take account of the risk of the connection breaking, the box 24 is connected to the probe body 22 by at least one safety cable 44 whose ends may be welded in sloping holes formed respectively in a bottom endpiece of the box 24 and in the second projection 30.

There follows a description, with reference to FIG. 4, of a method of inspection using apparatus of the kind described above. FIG. 4 shows a lift 45 mounted against the wall of a storage pool, the lift comprising a fixed cage made up of two pairs of vertical rails 46 fixed to the wall by arms 48 and surmounted by a platform 50. A mechanism 52 for driving the tubes 40 and 42 can be fixed on the platform. An assembly-receiving cradle 54 placed between the rails and the cage is made up of longitudinally-extending bars held together by frames, of a bottom 58 and of an inlet chute 60. The bottom and the chute are provided with rollers for guiding the cradle vertically. The bottom 58 is secured to a drive cable 61 wound on the drum of a winch 62.

The sequence of operations can then be as follows. A fuel assembly to be inspected is placed in the cradle and it is lowered by means of a winch. The stick-and-sleeve assembly is lowered in the guide tube to be inspected, with its orientation being identified (e.g. by bringing a mark carried by the stick or the drive tube into coincidence with a reference) until all of the projections have gone through the zone of smaller diameter. As soon as the end of the sleeve 20 is in contact with the end of the zone of smaller diameter, the sleeve moves relative to the stick, thereby providing an origin to which measurements can be referenced.

When the sleeve comes into its position of bearing against the zone of smaller diameter, the stick is blocked against vertically movement while the sleeve is left free. The winch 62 is put into operation to raise the fuel assembly at constant speed. The fuel assembly placed in the cradle rises at constant speed while the stick remains stationary and the sleeve also rises. During this upwards movement, the two pairs of sensors provide signals representative of the deformation of the shaft into mutually orthogonal directions. The remote measuring device 37 includes storage means and means for calculating the deformation in two orthogonal directions. These calculation means also perform vector summing in the two orthogonal directions. Simultaneously, the movement of the assembly is measured. A curve is thus obtained that is representative of the amount and direction of deformation over the entire length of the portion 16 of smaller diameter.

The tube drive mechanism 52 may be provided with a force sensor which detects when the stick comes into abutment against the bottom end plug of the guide tube. When this is detected, the stick can automatically be raised or the movement of the lift can be reversed. A second measurement can be performed during such movement in the opposite direction.

The apparatus also makes it possible to inspect the running portion of the guide tube by adding calibrated rings to the swelling 25 and the projections 28 and 30. These rings are of a diameter such as to provide a sliding fit in the running portion.

In order to improve measurement accuracy, a number of pairs of sensors greater than two may be provided. In particular, three sets of sensors may be placed at 60° relative to one another.

We claim:

1. Apparatus for internal inspection of a guide tube of a nuclear fuel assembly and measurement of deformations of an axis of the guide tube, said guide tube having a zone of smaller diameter in a terminal portion thereof, said apparatus comprising:

stick-shaped means having a distal portion which presents in succession, starting from a distal end of the stick-shaped means, a guiding swelling having a predetermined diameter selected to enable said swelling to pass through the zone of smaller diameter with an easy fit, and a first projection and a second projection at different distances from said swelling, with at least the first projection carrying at least two sets of diametrically opposite strain sensors provided with conductors linking them to a proximal end of the stick-shaped means; and a sleeve having an outer diameter selected for a sliding fit in a running portion of the guide tube above said zone of smaller diameter and an inner diameter selected for sliding fit over the stick-shaped means;

said sleeve and said stick-shaped means having mutually cooperating abutment means for limiting displacement of the sleeve towards said distal portion to a position where the sleeve surrounds the stick-shaped means.

2. Apparatus according to claim 1, wherein said strain sensors are resistive strain gauges fixed to the stick and each providing an output signal which is an increasing function of strains and deformations to which the stick-shaped means are subjected.

3. Apparatus according to claim 1, further comprising calibrated rings removably located around said projections and around said swelling, having a diameter selected for sliding movement within a running portion of the guide tube, with an easy fit.

4. Apparatus according to claim 1, wherein said stick-shaped means comprise a tubular probe body provided with said swelling and with said projections, a flexible or articulated sheath attached to said tubular probe body and a cable box connected to said sheath.

5. Apparatus according to claim 4, wherein said tubular probe body consists of a rod which is hollow over a length extending between said first projection and said second projection for passing sheaths and wherein electrical conductors for connecting said strain sensors to said cable box pass along and within said sheaths.

6. Apparatus according to claim 1, wherein axial spacings between the guide swelling, the first projection closer to the swelling and the second projection are much smaller than an axial length of the zone of smaller diameter.

7. Apparatus according to claim 6, wherein the axial spacing between the guiding swelling located at the distal end of the stick-shaped means and the first projection is substantially equal to the distance between the two projections.

8. Apparatus according to claim 1, further comprising means for removably connecting drive tubes to the stick-shaped means and to the sleeve.

9. A method for monitoring a degree of straightness of a guide tube of a nuclear fuel assembly having a zone of smaller diameter in a terminal portion thereof, comprising the steps of:

inserting, into said guide tube, from an end opposite to said terminal portion, an apparatus comprising:
- stick-shaped means having a distal portion which presents in succession, starting from a distal end of the stick-shaped means,
- a guiding swelling having a predetermined diameter selected to enable said swelling to pass through the zone of smaller diameter with an easy fit, and
- a first projection and a second projection at different distances from said swelling, with at least the first projection carrying at least two sets of diametrically opposite strain sensors provided with conductors linking them to a proximal end of the stick-shaped means; and
- a sleeve having an outer diameter selected for a sliding fit in a running portion of the guide tube above said zone of smaller diameter and an inner diameter selected for sliding fit over the stick-shaped means;

said sleeve and said stick-shaped means having mutually cooperating abutment means for limiting displacement of the sleeve towards said distal portion to a position where the sleeve surrounds the stick-shaped means, until said sleeve comes into abutment against an end of said zone of smaller diameter, further moving the guide tube relative to the stick-shaped means to make the projections scan said zone of smaller diameter, and deriving an amount of deformation and an orientation of deformation at each axial level of said narrower zone from signals delivered by the sensors and from measurement of displacement of the stick-shaped means along the guide tube.

* * * * *